United States Patent [19]

Spietschka et al.

[11] Patent Number: 4,732,618

[45] Date of Patent: Mar. 22, 1988

[54] POWDERED PIGMENTS WITH IMPROVED RHEOLOGICAL PROPERTIES, PROCESSES FOR THEIR PREPARATION AND THEIR USE WITH A CONTENT OF AT LEAST 5% OF UNSUBSTITUTED QUINACRIDONE

[75] Inventors: Ernst Spietschka, Idstein; Adolf Kroh, Selters; Otmar Hafner, Glashütten, all of Fed. Rep. of Germany

[73] Assignee: Hoechst Aktiengesellschaft, Frankfurt am Main, Fed. Rep. of Germany

[21] Appl. No.: 902,444

[22] PCT Filed: Dec. 12, 1985

[86] PCT No.: PCT/EP85/00700

§ 371 Date: Aug. 11, 1986

§ 102(e) Date: Aug. 11, 1986

[87] PCT Pub. No.: WO86/03763

PCT Pub. Date: Jul. 3, 1986

[30] Foreign Application Priority Data

Dec. 18, 1984 [DE] Fed. Rep. of Germany ....... 3446088
Nov. 30, 1985 [DE] Fed. Rep. of Germany ....... 3542437

[51] Int. Cl.$^4$ .............................................. C09D 17/00
[52] U.S. Cl. ........................... 106/288 Q; 106/308 M; 106/309; 528/49
[58] Field of Search .............. 106/288 Q, 308 M, 309; 528/49, 73

[56] References Cited

U.S. PATENT DOCUMENTS

| | | | |
|---|---|---|---|
| 3,615,812 | 10/1971 | Clark et al. | 106/308 M |
| 3,758,320 | 9/1973 | Flores | 106/309 |
| 3,865,605 | 2/1975 | Spietschka et al. | 106/308 S |
| 3,891,572 | 6/1975 | Moody et al. | 106/308 M |
| 3,904,562 | 9/1975 | Hopfenberg et al. | 106/309 |
| 4,116,628 | 9/1978 | Hesse et al. | 106/308 M |
| 4,155,892 | 5/1979 | Emmons et al. | 524/507 |
| 4,451,656 | 5/1984 | Dietz et al. | 548/352 |
| 4,455,173 | 6/1984 | Jaffe | 106/309 |

FOREIGN PATENT DOCUMENTS 0154678 9/1985 European Pat. Off. .

*Primary Examiner*—Paul Lieberman
*Assistant Examiner*—Willie J. Thompson

[57] ABSTRACT

Powdered pigments which contain at least 5% of unsubstituted quinacridone and have improved rheological properties for use in paint systems on an alkyd/melamine, acrylic/melamine, acrylate/isocyanate or polyester/isocyanate basis, both of a conventional nature and also of a modern nature of the "high solids" type, onto which—as appropriate before, during or after finishing—1 to 20% by weight of the active substance of a paint additive, prepared by reacting polyisocyanurates which still carry free isocyanate groups and are based on tolylene diisocyanate, hexamethylene diisocyanate or mixtures thereof, with (1) aliphatic mono- or poly-(hydroxycarboxylic acid) $C_1$–$C_{20}$-alkyl esters (degree of polymerization 2–50), (2) polyethylene glycols (molecular weight 500–1,500) and (3) 5- or 6-membered, saturated or unsaturated heterocyclic compounds which contain at least 1 nitrogen atom in the ring and reactive amino or hydroxy-$C_1$–$C_6$-alkyl groups, until isocyanate groups are no longer detectable, has/have been applied, processes for their preparation and their use for pigmenting polymeric materials and for coloring paint systems.

8 Claims, No Drawings

POWDERED PIGMENTS WITH IMPROVED RHEOLOGICAL PROPERTIES, PROCESSES FOR THEIR PREPARATION AND THEIR USE WITH A CONTENT OF AT LEAST 5% OF UNSUBSTITUTED QUINACRIDONE

The invention relates to powdered pigments which are coated with 1–20% by weight of the active substance of an additive of the polyurethane series prepared as fully described below and contain at least 5% by weight of unsubstituted quinacridone and have improved rheological properties for pigmenting polymeric materials, in particular the conventional and modern paint systems of the "high solids" type, and to the process for their preparation.

When organic pigments are dispersed in paint systems, the aim must be to achieve optimum stabilization of the pigment particles with the binders of the paint system. In addition to the chemical structure and the physical nature of the pigments, the dispersion method and, in particular, the type of binder and amount of solvent in the paint system is decisive for the degree of this stabilization. Inadequate stabilization leads to gloss, viscosity and flocculation problems, alongside deterioration of the coloristic pattern. A number of measures are known for improving these properties of the pigments, and these all lead to a clear reduction in the problems in conventional paint systems. The following may be mentioned here specifically: preparation with surface-active agents, such as, for example, resin soaps, alkylphenol polyglycol ether-sulfonates (German Patent No. 2,152,485) or quaternary ammonium compounds (Patent Application No. P 33 38 806.7); and, in the case of copper phthalocyanines or quinacridones, the addition of small amounts of sulfonic acids or sulfonic acid derivatives of the pigment on which the system is based. A number of paint additives which are added during paint conditioning to improve the rheological properties are also known and in some cases are commercially available.

As a result of new developments in the paint field with the aim of drastic reduction in the amount of solvent and a marked reduction in the size of the binder molecules, such as, for example, in the direction of "TSA-NAD" (thermosetting acrylic non-aqueous dispersion) and "high solids" (paint systems with a binder content of more than 50% during processing), there are considerable difficulties in achieving perfect stabilization of the pigments in these paint systems. For this reason, special additives have been developed, which either 1. are intended to solve the problem by mutual mechanical dispersion with the pigments in solvents and subsequent combination with the paint, or
2. are added to the paint/pigment mixture before mechanical dispersion.

U.S. Pat. Nos. 4,029,861, 4,032,698, 4,048,207 and 4,070,388 relate to an example of the first said route. Here, the pigment is subjected to predispersion in the paint solvent with the polymeric active substances, which are dissolved in organic solvents, up to 50% by weight of active substance, based on the pigment employed, being used. The pigment dispersion thus obtained is then added to the paint binder system for pigmenting.

The polymeric materials used for dispersion are prepared by linking polymeric structural units of the paint with organic compounds carrying acids, basic or silane end groups via at least bifunctional isocyanates of the aliphatic and aromatic series. Linking can be effected either by urethane or via urea groupings.

A fair number of wetting and dispersing additives for the second said route are known.

In European Published Application No. 0,154,678, addition compounds suitable as dispersing agents are proposed, which are obtained by reacting polyisocyanates having a mean functionality of 2.5 to 6 with monohydroxide compounds, reacting the reaction product obtained with compounds of the formula II

$$G-(E)_n \qquad \text{II}$$

wherein E is —OH, —NH$_2$ and/or —NHR (R representing an alkyl group having 1 to 4 carbon atoms), n is 2 or 3 and G is an aliphatic, cycloaliphatic and/or aromatic group, and further reaction of the reaction product thus obtained with compounds of the formula III

$$Z-Q \qquad \text{III}$$

wherein Q is —OH, —NH$_2$, —NHR (R representing an alkyl group having 1 to 4 carbon atoms) or —SH and Z is a group which contains at least one nitrogen-containing basic group.

Both in the case of the technology from U.S. Pat. Nos. 4,029,861, 4,032,698, 4,048,207 and 4,070,388, that is to say, for example, predispersing of the pigments with relatively large quantities of the additive (up to 50%) followed by addition to the paint system, and in the case of additives for the second said route, paints were obtained which, depending on the pigment employed and the binder system used, lead to coatings of high gloss and sometimes higher tinctorial strengths, because of the elimination of flocculation, coupled with good viscosity properties, and which markedly differ from coatings without use of the additive. This positive effect does not generally apply to all pigments and paint systems or pigment/binder combinations.

Thus, in quite a number of cases no improvement is achieved or a contrary effect is observed.

Furthermore, with these technologies, the nature and amount of the additive for the particular pigment and binder system must be determined empirically for these technologies, since an optimum result can be achieved only if the specifically required amount, which can vary between 5 and 50%, is maintained. This can lead to considerable coloristic problems, especially in the pigment mixtures which are customary in the preparation of colored paints.

However advantageous the effect of the polymeric urethane resins, for example in the route proposed in European Published Application, No. 0,154,678, is for the preparation of paints of high rheological quality, this type of application nevertheless also presents disadvantages in practice.

The addition of up to 20% of additive during paint conditioning, such as is recommended, for example, in the case of commercially available paint additives of this type, leads to a marked increase in the solvent content of the paint system and thus goes against the trend in the latest devetopment of paint systems, such as drastic reduction in the amount of solvent in the paint.

In addition, some commercially available pigments, as already mentioned, do not respond to these additives, which can lead to trouble, especially when pigment mixtures are used in combination with the additive in the preparation of the paint. Intolerances with pigments which have already been surface-treated have also been observed.

The application of these additives to pigments in suspension during or after the preparation has proved to be a particular problem.

There is therefore the need to develop powdered pigments of a quality such that no further additives are required during paint conditioning to achieve optimum rheological properties, and in particular also in modern paint systems, such as "TSA-NAD" and "high solids".

It has now been found that it is possible to prepare powdered pigments which contain at least 5% of unsubstituted quinacridone and have improved rheological properties for use in plastic compositions, in particular in conventional paint systems or modern paint systems of the "high solids" type on an alkyd/melamine, acrylic/melamine, acrylate/isocyanate or polyester-/isocyanate basis by coating the base pigments with 1–20% by weight of the active substance of additives during finishing of the pigment—as appropriate before, during or after finishing—which additives are synthesized from the following components.

Polyisocyanates which still contain free isocyanate groups, for example based on tolylene diisocyanate (such as, for example, $^R$Desmodur IL from Bayer AG) or hexamethylene diisocyanate or mixtures thereof, are reacted with the following compounds in succession or with a mixture of them until isocyanate groups are no longer detectable:

1. aliphatic mono- or poly-(hydroxycarboxylic acid) $C_1$–$C_{20}$-alkyl esters (degree of polymerization 2–50), such as, for example, the polyester from 1 mole of decanol and 7 moles of ε-caprolactone,
2. polyethylene glycols (molecular weight 500–1,500) and
3. 5- or 6-membered saturated or unsaturated heterocyclic compounds which have at least one nitrogen atom in the ring system and carry a group which can react with isocyanates, and can be summarized by the general formula

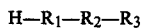

$$H-R_1-R_2-R_3 \qquad (I).$$

In this formula, $R_1$ represents —O— or —NH—, $R_2$ represents an alkylene group with 1–6 carbon atoms and $R_3$ represents a 5- or 6-membered, saturated or unsaturated heterocyclic ring system containing nitrogen atoms.

Examples of compounds of the said formula (I) mentioned are 1-(2-hydroxyethyl)-pyrrolidine, 2-(1-pyrrolidyl)-ethylamine, 1-(2-hydroxyethyl)-piperidine, 2-(1-piperidyl)ethylamine, 1-(2-aminopropyl)-piperidine, 4-(2-hydroxyethyl)-morpholine, 2-(4-morpholinyl)-ethylamine, 4-(3-aminopropyl)-morpholine, 1-(2-hydroxyethyl)-piperazine, 1-(2-aminoethyl)-piperazine, 1-(2-hydroxyethyl)-2-alkylimidazolines, 1-(3-aminopropyl)-imidazole, 1-(3-hydroxypropyl)-imidazole, (2-aminoethyl)-pyridine, (2-hydroxyethyl)-pyridine, (3-hydroxyproyl)-pyridine, (2-hydroxymethyl)-pyridine and N-methyl-2-hydroxymethyl-piperidine.

The reactions are carried out in a manner known per se, such as, for example, in U.S. Pat. No. 4,032,698, European Published Application No. 0,154,678 or patent application No. P 3,446,084.5. The reactions are carried out in inert solvents; usually, solvents such as hydrocarbons and ethyers, esters, ketones and acid amides are used.

When the addition products are used as paint additives in paint conditioning, this type of solvents is highly desirable, since solvents of this type are also present in the paint system.

For use in aqueous systems, this type of solvent is less suitable.

For this application, it is preferable to carry out the reaction in at least partially water-miscible inert solvents, for example those mentioned in Patent Application No. P 3,446,084.5.

It can also be advantageous to carry out the addition reactions at elevated temperatures and in high concentrations and, after the reaction has been completed, to dilute with water-miscible solvents.

The present invention specifically relates to powdered pigments which contain at least 5% of unsubstituted quinacridone and have improved rheological properties for coloring polymeric materials, in particular paint systems onto which before, during or after finishing 1–20% by weight of the active substance of the additives according to the invention have been applied, the process for the preparation of the coated pigments and to their use.

It was not to be expected that the result of the invention can be achieved in the absence of paint binders without using mechanical shearing forces, as in the case of addition of the additive to the paint, when the resinous additive is added during the pigment preparation, namely before, during or after finishing, in an aqueous suspension which, in addition to the pigment, still contains at least partially water-miscible solvents, but this does not exclude exposure of the pigment suspension to shearing forces during preparing—as appropriate before, during or after finishing.

It was furthermore not to be expected that it is possible to achieve the same maximum effect on application of the urethane resin in the pigment suspension—as appropriate before, during or after finishing—since resin portions which are not adsorbed onto the pigment surface are present, on drying of the pigment powder, as coarser portions which are known to dissolve only with great difficulty during conditioning of the paint and would interfere with the desired effect, as in fact occurs with purely mechanical mixtures.

Surprisingly, it has been found that, by suitable coating with the abovementioned additives of the polyurethane series, not only rheologically perfect pigments are obtained, but that the quantity of the additive can be drastically reduced as compared with the application during paint conditioning.

Thus, for example, in the case of the γ-modification of unsubstituted quinacridone, a rheologically perfect paint is obtained even when coating with a low concentration of the active substance of the additive—as named in Example 1.

If the additive is added during paint conditioning, more than twice the concentration of the additive must be employed in order to achieve a comparable effect.

Moreover, the pigment coated during the preparation shows a markedly higher tinctorial strength.

The advantage of the procedure according to the invention, retaining the optimum coloristic and rheological effect, is to be seen in the fact that no additional solvent is introduced into the paint system, the amount of additive is drastically reduced, application in aqueous phase is possible and the active substance is firmly adsorbed on the surface of the pigments and cannot interact with other pigments during conditioning of the paint, and no specks appear in the paint.

The powdered pigments according to the invention, in particular quinacridone pigments, are those which contain at least 5% by weight and up to 100% of unsubstituted linear trans-quinacridone. The pigment mixtures can be in the form of a mixture or preferably in the form of mixed crystals.

Preferred pigments of the process according to the invention are the β- and γ-crystal modifications of pure unsubstituted linear trans-quinacridone, mixtures and mixed crystals of at least 5% of unsubstituted quinacridone and the following quinacridones

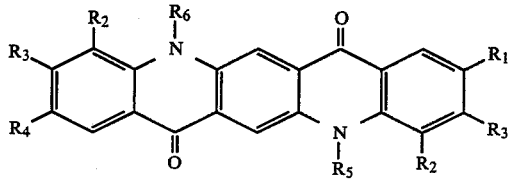

$R_1$ = H, alkyl$C_1$-$C_4$, Hal, —CONR$_7$R$_8$, alkoxy$C_1$-$C_4$
$R_2$ = H, alkyl$C_1$-$C_4$, Hal, —CONR$_7$R$_8$, alkoxy$C_1$-$C_4$
$R_3$ = H, alkyl$C_1$-$C_4$, Hal, —CONR$_7$R$_8$, alkoxy$C_1$-$C_4$
$R_4$ = H, alkyl$C_1$-$C_4$, Hal, —CONR$_7$R$_8$, alkoxy$C_1$-$C_4$
$R_5$ = H, alkyl$C_1$-$C_4$
$R_6$ = H, alkyl$C_1$-$C_4$
$R_7$ = H, alkyl$C_1$-$C_{12}$
$R_8$ = H, alkyl$C_1$-$C_3$ Very particularly preferred pigments of the process according to the invention are the β- and γ-modifications of unsubstituted quinacridone and mixed crystals of 2,9-dimethylquinacridone and unsubstituted quinacridone.

The most obvious way, of isolating the active substance of the additive and mixing this in solid form with the base pigment, fails since the active substance in general cannot be dissolved completely in the context of paint preparation. Only a slight effect in the direction of improvement in rheology is thus achieved, and the non-dissolved resin constituents interfere with the coloristic pattern.

Since the abovementioned additives and also the additives proposed, for example, in European Published Application No. 0,145,678, are present, as a result of the preparation, in solvents which are immiscible or only partially miscible with water, the nature and manner of applying the additives to the pigments is of decisive importance.

Depending on the embodiment, the addition can be made to the aqueous pigment suspension, to the pigment suspension in water/solvent mixtures or to the pigment suspension in solvents—as appropriate before, during or after pigment finishing.

With some pigments, especially with hiding pigments of high quality, it is thus possible to stir the dissolved additive in the form, in which it is prepared, into the solvent-free base pigment suspension obtained during the preparation. When absorption of the additive onto the base pigment has ended, the additive solvent can be removed by distillation.

If the solvent of the additive leads to undesirable coloristic changes to the pigment or to technical difficulties during application to the pigment suspension, it is advantageous to use the additive in a solvent which is also suitable or used for finishing.

Solvents which are suitable for the process according to the invention are preferably those which are at least partly water-miscible, such as, for example, aliphatic alcohols with 1-6 carbon atoms, such as, for example, ethanol, propanol, isobutanol or amyl alcohol; glycols, glycol ethers and glycol esters, such as, for example, ethylene glycol, diethylene glycol, propylene glycol, glycol mono-$C_1$-$C_6$-ethyl (sic) ethers, diglycol mono-$C_1$-$C_4$-alkyl ethers, diglycol dimethyl ether, ethylglycol acetate, methylglycol acetate and butyldiglycol acetate; ketones of the general formula

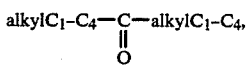

such as, for example, acetone, methyl ethyl ketone, methyl isobutyl ketone or diacetone alcohol (4-methyl-4-hydroxy-pentan-2-one); aliphatic carboxylic acids with 1-4 carbon atoms, such as, for example, formic acid, acetic acid or propionic acid, aliphatic carboxylic acid amides with 1-5 carbon atoms, such as, for example, dimethylformamide; and cyclic carboxylic acid amides, such as, for example, N-methylpyrrolidone.

The use of the solvents mentioned is advisable, in particular, in connection with thermal aftertreatment of a pigment—for example to increase its hiding power or to improve other technological properties. The solvent in which the thermal aftertreatment of the pigment is carried out is advantageously chosen here. The addition of the additive or its solution can also be effected here before, during or after the finishing. The solvent can then be driven off rapidly and quantitatively, for example by steam, and the pigment can then be isolated from the aqueous suspension which remains.

The application of the active substance in one of the solvents mentioned can also be effected without prior or subsequent thermal treatment (finishing) of the pigment, the solvent used being distilled off again, for example with steam, immediately after addition of the additive solution to the aqueous pigment suspension, with intensive stirring.

If the additive is not available in such a solvent, the active substance of the additive should be converted into an appropriate form suitable for the particular pigment, i.e. the active substance should be isolated and dissolved in a suitable solvent for the preparation. There are various methods for converting the active substance of the additive into a form suitable for the process according to the invention.

1. To isolate the active substance of the additive, the solvent can be distilled off under reduced pressure and the active substance which remains can be dissolved in a solvent suitable for the preparation, such as, for example, lower aliphatic carboxylic acids, ketones, alcohols or esters.

2. Another very widely applicable preferred method comprises a procedure in which the solvent, in which the additive is dissolved, is distilled off from the additive, after addition of high-boiling solvents suitable for the preparation, such as, for example, aliphatic carboxylic acids, glycols or glycol acetates, and the active substance of the additive is thus brought into a dissolved form suitable for use. It is advantageous here to carry out the distillation under reduced pressure and to distill off the solvent azeotropically in the presence of small amounts of water.

For later use, according to the invention, of the active substance of the additive, it is advantageous if the organic solvent in which the active substance of the additive is dissolved after these measures is at least partially water-soluble, because the additive can thereby be applied in a simple manner in aqueous pigment suspensions. The use of organic carboxylic acids is particularly advisable since the claimed additives have a weakly basic character. In these cases, it may be advantageous to neutralize the organic acid or render the pigment suspension weakly alkaline after preparation.

It may furthermore be of advantage to neutralize the basic groups of the additives according to the invention with equivalent amounts of anionic auxiliaries, such as, for example, alkylphenol polyglycol ether-sulfates, resin soaps or sulfosuccinic acid esters.

The addition of these auxiliaries can in each case be carried out before, during or after finishing. However, it is not necessary to add the additive and auxiliary in the same stage of pigment finishing.

The powdered pigments prepared according to the invention very satisfactory rheological properties, such as markedly improved gloss, viscosity and flocculation properties, in all paint systems, but above all in the systems which are usually difficult to pigment, such as "TSA-NAD" and "high solids".

The process according to the invention is illustrated in more detail by the following examples. The parts and percentages mentioned here relate to the weight.

EXAMPLE 1

200 parts of an aqueous pigment suspension with a pigment content of 6–7% of the hiding γ-modification of C.I. Pigment Violet 19 (73900), such as is obtained after finishing, are heated to 50° C. in a stirred vessel, with stirring, and 3.5 parts of an additive, the preparation of which is described in Example E, are slowly added at this temperature. After the mixture has been stirred at 50° C. for 3 hours, it is brought to pH 8 with dilute sodium hydroxide solution and stirred at 50° C. for a further hour. Thereafter, the additive solvent is distilled off with steam and the pigment is filtered off, washed with water and then dried. The pigment yield is at least 98% of theory. The bluish-tinged red pigment prepared in this manner is the linear transquinacridone in a highly crystalline γ-modification. It is distinguished by outstanding rheological properties; the full shade paint coatings of high hiding power produced with it exhibit a fog-free clear color shade and a quite outstanding gloss.

For comparison, a pigment was prepared under otherwise identical conditions, but without the addition of additive.

The comparison coloration is clearly more matt in the full shade paint coatings with a milky fog, and the viscosity in "high solids" is clearly poorer. For comparison of the gloss values, the full shade cast films, stoved in an oven, of 7% "TSA-NAD" paints prepared under the same conditions which, before casting, were brought to a viscosity of 20 seconds (measured in a φ 4 mm Ford cup) with paint solvents, were measured with a Hunterlab D48D gloss-measuring apparatus under an angle of 20°, the following values being read off:

| | |
|---|---|
| Pigment according to Example 1: | 81.5 |
| Comparison example: | 31.8 |

EXAMPLE 2

If the procedure followed is as described in Example 1, but, instead of the additive mentioned there, 3.9 parts of the additive obtained according to Example A are employed and the pigment is then isolated without prior distillation, a comparable result is also obtained. Gloss value: 80.5.

EXAMPLE 3

500 parts of an aqueous-isobutanolic pigment suspension (isobutanol content 20%) with a pigment content of 6.5% of the hiding γ-modification of C.I. Pigment Violet 19, such as is obtained after finishing, are heated to 50° C., with stirring, and a solution of 6 parts of additive solution (22%) (prepared according to Example K) and 12 parts of 100% pure isobutanol is added at this temperature in the course of 30 minutes. The mixture is then stirred at 50° C. for a further 3 hours and brought to pH 7.5 with dilute sodium hydroxide solution, and stirring is continued at 50° C. for 2 hours. The isobutanol is then distilled off with steam and the pigment is filtered off, washed with water and dried at 80° C. The bluish-tinged red pigment obtained in a yield of more than 98% exhibits a fog-free full shade paint coating of high hiding power, an excellent gloss and an outstanding viscosity in the "TSA-NAD" system. A value of 88.8 was determined in the gloss measurement according to Example 1. In contrast, the non-prepared comparison shows a gloss value of 31.8.

EXAMPLE 4

(a) 13.6 parts of the additive solution obtained according to Example I are slowly added to 500 parts of a 6% aqueous suspension of the β-crystal modification of C.I. Pigment Violet 19 (73900) at 70° C., with stirring. The mixture is then stirred at 70° C. for 5 hours, brought to pH 8 with aqueous sodium hydroxide solution and stirred at 70° C. for 1 further hour and the pigment is isolated and dried at 80° C. The β-crystal modification of the linear trans-quinacridone with outstanding rheological properties is obtained.

The gloss measurement, as the degree of flocculation of the red-violet, fog-free full shade paint coating on film according to Example 1, gave a gloss value of 89.5, in contrast with the value of 79 for the non-prepared comparison.

(b) If 13.6 parts of the additive obtained according to Example La are employed as the additive and the procedure is otherwise as described in Example 4a, a red-violet pigment with comparable properties is obtained. Gloss value: 91.

EXAMPLE 5

A solution of 2.7 parts of the additive obtained according to Example K and 8.1 parts of ethanol is added to 100 parts of a 6% aqueous-alcoholic suspension (ethanol content 10%) of the β-crystal modification of C.I. Pigment Violet 19 (73900) at room temperature, with stirring, and the mixture is stirred at room temperature for 12 hours. It is then brought to pH 9.5 with dilute sodium hydroxide solution, subsequently stirred for 3 hours and filtered with suction and the residue is washed with water and dried.

The fog-free red-violet full shade paint coating has outstanding gloss. The gloss measurement on film according to Example 1 shows a value of 90.5.

EXAMPLE 6

20.4 parts of the solution, consisting of 6.8 parts of a 22% additive solution (according to Example K) and 13.6 parts of isobutanol, is added dropwise at 50° C. in the course of 30 minutes to 200 parts of an aqueous-isobutanolic quinacridone suspension (isobutanol content 30%, pigment content 8.8% of quinacridone mixed crystals consisting of 3 parts of 2,9-dimethylquinacridone and 1 part of unsubstituted quinacridone in the lattice of the 2,9-dimethylquinacridone). The mixture is then stirred for 3 hours at 50° C. and then brought to pH 8.5 with dilute sodium hydroxide solution and stirred for 2 hours at 50° C. The isobutanol is then distilled off with steam and the pigment is filtered off, washed with water and dried.

The pigment, a brilliant magenta, exhibits a highly transparent, rheologically almost perfect coating in the alkyd/melamine resin paint system, in acrylic/melamine resin paint systems and in TSA-NAD systems.

| Gloss value measured as in Example 1: | 80.5 |
|---|---|
| Non-prepared comparison: | 49 |

EXAMPLE 7

A solution of 10.76 parts of the additive obtained according to Example I and 22 parts of 100% isobutanol is added to 1,000 parts of an aqueous-isobutanol pigment suspension (isobutanol content 40%, pigment content 6%) of the γ-crystal modification of C.I. Pigment Violet 19 at the boiling point and the mixture is then stirred at the boiling point for 3 hours. It is then brought to pH 7.5 with dilute sodium hydroxide solution and stirred for a further 2 hours, the isobutanol is distilled off with steam and the pigment is filtered off, washed with water and dried. 62 parts of a bluish-tinged red pigment powder are obtained.

Gloss measurement on film as described in Example 1 gave a gloss value of 88.

EXAMPLE 8

A solution of 80 parts of additive solution (22%) (prepared according to Example I) and 160 parts of 100% isobutanol is added in the course of 30 minutes at 50° C. with stirring to 2,000 parts of pigment suspension (isobutanol content 50%) which contains 176 parts of a solid solution of 2,9-dimethylquinaoridone and unsubstituted quinacridone in a 9:1 ratio. The mixture is then stirred for 3 hours at the boiling point, then brought to pH 8–8.5 with dilute sodium hydroxide solution and boiled for a further 2 hours. Subsequently, the isobutanol is distilled off with steam, and the pigment is filtered off, washed with water and dried at 80° C. The magenta pigment obtained in a yield of 98.5% shows in "TSA-NAD" a transparent, fog-free full shade paint coating of high gloss and good viscosity.

| Gloss measurement according to Example 1: | 78.3 |
|---|---|
| Untreated comparison: | 42.7 |

EXAMPLE 9

125 parts of the 3.6% additive solution, prepared according to Example H, are added at 80° C. with stirring to 500 parts of an aqueousisobutanolic pigment suspension (isobutanol content 35%, pigment content 7.5% of a pigment mixture of 8 parts of unsubstituted quinacridone and 1 part of 2,9-di-N-methyl-carbamoyl-quinacridone), and the mixture is boiled for 4 hours. The isobutanol is then distilled off and the pigment is isolated.

| Gloss value of the bluish-tinged red full shade paint coating according to Example 1: | 81.2 |
|---|---|
| Non-prepared comparison: | 28 |

EXAMPLE 10

Following the procedure as described in Example 9 but employing, in place of the additive used there, 25 parts of the additive obtained according to Example M and diluted with 25 parts of diethylene glycol monoethyl ether, a comparable result is obtained.

EXAMPLE 11

22.5 parts of a solution of a 20% additive, which was obtained according to Example D and by subsequent transfer into the propionic acid solution according to Example I, mixed with 45 parts of ethyl alcohol, are added dropwise at room temperature in the course of 2 hours to 500 parts of an aqueous-alcoholic pigment suspension (ethanol content 40%) which contains a pigment consisting of 8 parts of unsubstituted quinacridone and 1 part of 4,11-difluoroquinacridone. The mixture is then stirred for 16 hours at 25°–30° C., then brought to pH 8.5 with dilute sodium hydroxide solution, heated to the boil and boiled for 2 hours. The ethyl alcohol is then distilled off, the pigment is filtered off, washed with water until free of salt and dried. This give 48 parts of a scarlet-red pigment powder. The gloss measurement on film, as described in Example 1, gave a gloss value of 85. The non-prepared comparison . . . (sic) a gloss value of 41.

EXAMPLE 12

500 parts of a moist crude quinacridone mixture (solids content 18.5%) of 70% of dimethylquinacridone and 30% of unsubstituted quinacridone are suspended in 1,000 parts of isobutanol and stirred for 30 minutes at 50° C. 45 parts of 21.8% additive (prepared according to Example Lc), diluted with 90 parts of isobutanol, are then added in the course of 20 minutes. Subsequently, the mixture is heated to the boil and boiled for 5 hours under reflux, about 200 parts of the aqueous phase of the azetrope (isobutanol content about 8–9%) being separated off. The propionic acid is then neutralized with dilute sodium hydroxide solution, boiling is continued for 2 hours, the isobutanol is distilled off with steam and the pigment is filtered off. The pigment which has been filtered off is washed with water until free of salt and dried.

The pigment, a brilliant magenta, exhibits a transparent, rheologically almost perfect paint coating in the abovementioned paint systems.

| Gloss value measured as in Example 1: | 82 |
|---|---|

| -continued | |
|---|---|
| Non-prepared comparison: | 53 |

EXAMPLE 13

20.4 parts of a solution, consisting of 6.8 parts of 22% additive solution (according to Example Lb) and 13.6 parts of isobutanol are added dropwise at 50° C. in the course of 30 minutes to 200 parts of an aqueous-isobutanolic quinacridone suspension (isobutanol content 30%, pigment content 7.5% of quinacridone mixture consisting of 2 parts of 2,9-dimethylquinacridone and 8 parts of unsubstituted quinacridone). The mixture is then stirred for 3 hours at 50° C. and subsequently brought to pH 8.5 with dilute sodium hydroxide solution and stirred for 2 hours at 50° C. The isobutanol is then distilled off with steam, and the pigment is filtered off, washed with water and dried. The pigment, a brilliant bluish-tinged red, exhibits a transparent perfect paint coating in the alkyd/melamine resin paint system, in acrylic/melamine resin paint systems and in TSA-NAD systems.

| Gloss value measured as in Example 1: | 83 |
|---|---|
| Non-prepared comparison: | 53 |

EXAMPLE 14

26.5 parts of a solution, consisting of 6.5 parts of 22% additive solution (according to Example 9) and 20 parts of isobutanol are added dropwise at 50° C. in the course of 30 minutes to 200 parts of an aqueous-isobutanolic quinacridone suspension (isobutanol content 30%, pigment content 8% of quinacridone consisting of 1 part of 2,9-dimethoxyquinacridone and 9 parts of unsubstituted quinacridone). The mixture is then stirred for 5 hours at 75° C. and subsequently brought to pH 8.5 with dilute sodium hydroxide solution and stirred for 2 hours at 75° C. The isobutanol is then distilled off with steam, and the pigment is filtered off, washed with water and dried. The pigment, a brilliant, deeply bluish-tinged red, exhibits a transparent perfect paint coating in the alky/melamine resin paint system, in acrylic/melamine resin paint systems and in TSA-NAD systems.

| Gloss value measured as in Example 1: | 85 |
|---|---|
| Non-prepared comparison: | 43 |

EXAMPLE A 31.5 parts of a 50% solution of a polyisocyanate with the idealized structure of the following formula

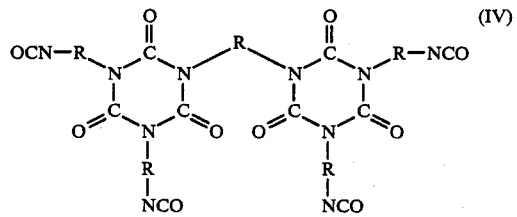

in which R denotes the tolylene radical, 31.5 parts of ethylglycol acetate and 0.04 parts of dibutyl-tin dilaurate are placed into a stirred vessel and warmed to 50° C. 19.1 parts of a polyester of 1 mole of decanol and 7 moles of ε-caprolactone, dissolved in 19.1 parts of ethylbenzene, are added rapidly and the mixture is stirred at 80° C. for 1 hour. The NCO content is thereby reduced from 2.4% at the start of the first part reaction to 1.6%.

8 parts of a polyethylene glycol (average molecular weight 1,000) and 3.75 parts of N-(3-aminopropyl)-imidazole are dissolved in 73.5 parts of xylene at 50° C. in a second reaction vessel. The reaction product from the first reaction stage is added dropwise in the course of 30 minutes and the batch is stirred at 80° C. for a further 2 hours. An almost clear, colorless, low-viscosity product with a solids content of 25%, the IR spectrum of which no longer shows NCO band, is obtained. Average molecular weight of the solid: 6,300.

EXAMPLE B

If in Example A the 1-(3-aminopropyl)-imidazole, employed there, is replaced by the equivalent amount of 1-(3-hydroxypropyl)-imidazole, a colorless, likewise low-viscosity product having a solids content of about 25% and no longer showing an NCO band in the IR spectrum is obtained in an otherwise identical procedure.

Average molecular weight of the solid: 6,200.

EXAMPLE C

If the procedure as described in Example A is followed but, instead of 1-(3-aminopropyl)-imidazole, the equivalent amount of 4-(3-aminopropyl)-morpholine is employed, a polymeric, likewise low-viscosity product, in the IR spectrum of which an NCO band is no longer detectable, is obtained.

EXAMPLE D

If in Example A the polyethylene glycol employed there is replaced by a polyethylene glycol of an average molecular weight of 600, a comparable product is obtained in otherwise the same procedure.

EXAMPLE E 10 parts of diglycol dimethyl ether, 24 parts of a 60% solution of a polyisocyanate, the idealized structure of which is given in Example A and in which, in the indicated formula IV, R represents the toluylene and hexamethylene radical in the ratio 3:2, and 0.03 parts of dibutyl-tin dilaurate are placed into a reaction vessel and warmed to 50° C. 19.1 parts of a polyester of 1 mole of decanol and 7 moles of ε-caprolactone in 19.1 parts of diglycol dimethyl ether are added dropwise in the course of 10 minutes. After a reaction time of 2 hours at 80° C., the NCO content drops from 3.45% at the start of the reaction to 2.3%. 8 parts of a polyethylene glycol (average molecular weight 1,000) and 3.75 parts of N-(3-aminopropyl)-imidazole are dissolved in 28.25 parts of diglycol dimethyl ether in a second reaction vessel. The reaction product of the first reaction stage is added to this solution at 50° C. in the course of 30 minutes and the batch is stirred at 80° C. for a further 2 hours. An almost clear, colorless product with good flow properties and a solids content of 36.5%, the IR spectrum of which no longer shows NCO groups, is obtained.

Average molecular weight of the solid: 5,100.

EXAMPLE F

Proceeding as described in Example E but employing, in place of the polyethylene glycol used there, the equivalent amount of polyethylene glycol of average molecular weight 1500, a polymeric product no longer showing any NCO bands is likewise obtained.

EXAMPLE G 31.5 parts of a 50% solution in butyl acetate of a polyisocyanurate of the formula (IV) (see Example A), in which R represents the toluylene radical, 31.5 parts of xylene and 0.04 part of dibutyl-tin dilaurate are placed into a stirred vessel and warmed to 40°–50° C. 19.1 parts of a polyester of 1 mole of decanol and 7 moles of ε-caprolactone, dissolved in 19.1 parts of xylene, are then added and, for the addition reaction, the mixture is stirred at 40°–50° C.

After the NCO content has decreased by about 25%, 8 parts of a polyethylene glycol (average molecular weight 1000) are added and, after about 50% in total have been converted, 3.75 parts of N-(3-aminopropyl)-imidazole dissolved in 41.4 parts of xylene are added and the mixture is stirred at 60° C. until NCO groups are no longer detectable. A viscous, pale amber-colored liquid is obtained.

Solids content about 30%.

EXAMPLE H 100 parts of additive (prepared according to Example G) are evaporated to dryness in vacuo. The remaining resin is dissolved in 800 parts of isobutanol.

EXAMPLE I 50 parts of water and 250 parts of propionic acid are added with stirring to 200 parts of the additive obtained according to Example A. With stirring, a solvent/water mixture is distilled off in vacuo at 40°–60° C., until xylene is no longer detectable in the bottoms. This gives a 22% solution of the additive in propionic acid.

EXAMPLE K 50 parts of water and 275 parts of propionic acid are added with stirring to 200 parts of the 30% additive (prepared according to Example G). An azeotrope of xylene, butyl acetate, propionic acid and water is then distilled off in vacuo (15–20 mm Hg) at 40°–60° C. with stirring, until xylene is no longer detectable in the distillation bottoms. This gives an about 20–25% solution of the additive of (sic) propionic acid.

EXAMPLES La–d

Following the procedure as described in Example I but employing 200 parts of each of the additives prepared according to Examples B, C, D and F, the corresponding propionic acid solutions of the additives are obtained:
(a) Propionic acid solution of Additive F
(b) Propionic acid solution of Additive B
(c) Propionic acid solution of Additive C
(d) Propionic acid solution of Additive D

EXAMPLE M 380 parts of diethylene glycol monoethyl ether and 20 parts of water are added with stirring to 200 parts of the additive (30%) (prepared according to Example G). Xylene, butyl acetate and water are then distilled off in vacuo (about 70 mm Hg) with stirring, until xylene is no longer detectable in the bottoms. This gives an about 15% solution of the additive in diethylene glycol monoethyl ether.

We claim:

1. A powdered pigment which contains at least 5% of unsubstituted quinacridone and has improved rheological properties for use in a paint system on an alkyd/melamine, acrylic/melamine, acrylate/isocyanate or polyester/isocyanate basis both of a conventional nature and of a modern nature of the "high solids" type, onto which—as appropriate before, during or after finishing—1 to 20% by weight of the active substance of a paint additive prepared by reacting polyisocyanurates which still carry free isocyanate groups and are based on tolylene diisocyanate, hexamethylenediisocyanate or mixtures thereof, with (1) aliphatic mono- or poly-(hydroxycarboxylic acid)$C_1$–$C_{20}$-alkyl esters (degree of polymerization 2–50), (2) polyethylene glycols (molecular weight 500–1,500) and (3) 5- or 6-membered, saturated or unsaturated heterocyclic compounds which contain at least 1 nitrogen atom in the ring and contain reactive amino or hydroxy-$C_1$–$C_6$-alkyl groups, until isocyanate groups are no longer detectable, has/have been applied.

2. A process for the preparation of a powdered pigment which contains at least 5% of unsubstituted quinacridone and has improved rheological properties for use in a paint system on an alkyd/melamine, acrylic/melamine, acrylate/isocyanate or polyester/isocyanate basis both of a conventional nature and of a modern nature of the "high solids" type, which comprises treating the base pigment—as appropriate before, during or after finishing —with 1 to 20% by weight of the active substance of a paint additive said paint additive being prepared by reacting polyisocyanurates based on tolylene diisocyanate, hexamethylene diisocyanate or mixtures thereof with (1) aliphatic mono- or poly-(hydroxycarbocylic acid) $C_1$–$C_{20}$-alkyl esters (degree of polymerization 2–50), (2) polyethylene glycols (molecular weight 500–1,500) and (3) 5- or 6-membered, saturated or unsaturated heterocyclic compounds which contain at least 1 nitrogen atom in the ring and still carry reactive amino or hydroxy-$C_1$–$C_6$-alkyl groups, until isocyanate groups are no longer detectable.

3. The process as claimed in claim 2, wherein the active substance of the paint additive is prepared as set forth in claim 2 and, when used in said process, is dissolved in organic solvent which is at least partially water-miscible.

4. The process as claimed in claim 3, wherein said active substance of the paint additive, when used in said process, is dissolved in an aliphatic alcohol of 1–6 carbon atoms, glycol, glycol ether, glycol ester, ketone of the formula

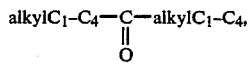

aliphatic carboxylic acid of 1–4 carbon atoms, aliphatic carboxylic acid amide of 1–5 carbon atoms or cyclic carboxylic acid amide or a mixture of these solvents.

5. The process as claimed in claim 3, wherein said active substance of the paint additive, when used in said process, is dissolved in ethanol, propanol, isobutanol, amyl alcohol, ethylene glycol, diethylene glycol, propylene glycol, a glycol mono-$C_1$–$C_6$-alkyl ether, a diglycol mono-$C_1$–$C_4$-alkyl ether, diglycol dimethyl ether, ethylglycol acetate, methylglycol acetate, butyldiglycol acetate, acetone, methyl ethyl ketone, methyl isobutyl ketone, diacetone alcohol, formic acid, acetic acid, propionic acid, dimethylformamide or N-methylpyrrolidone.

6. The method of using the powdered pigment of claim 1 comprising the step of pigmenting a polymeric material with said pigment.

7. The method of using a powdered pigment of claim 1 comprising the step of coloring a paint system with said pigment.

8. A powdered pigment which contains at least 5% of unsubstituted quinacridone and has improved rheological properties for use in an alkyd/melamine, acrylic/melamine, acrylate/isocyanate or polyester/isocyanate paint system, said powdered pigment having been treated—before, during or after finishing—with the effective ingredient of a paint additive prepared by reacting free isocyanate-containing polyisocyanurates, based on toluylene diisocyanate, hexamethylene diisocyanate or mixtures thereof, with (1) aliphatic mono- or poly-(hydroxycarboxylic acid) $C_1$-$C_{20}$-alkyl ester, having a degree of polymerization of 2–50;

(2) a polyethylene glycol having a molecular weight of 500–1500; and (3) a 5- or 6-membered, saturated or unsaturated heterocyclic compound containing at least 1 nitrogen atom in the ring and containing a reactive amino or hydroxy-$C_1$–$C_6$-alkyl group;

the reaction with the free isocyanate-containing polyisocyanates being continued until free isocyanate groups are no longer detectible.

* * * * *